No. 741,833. PATENTED OCT. 20, 1903.
E. E. RISIEN.
METHOD OF REGULATING GROWTH.
APPLICATION FILED MAY 8, 1903.
NO MODEL.
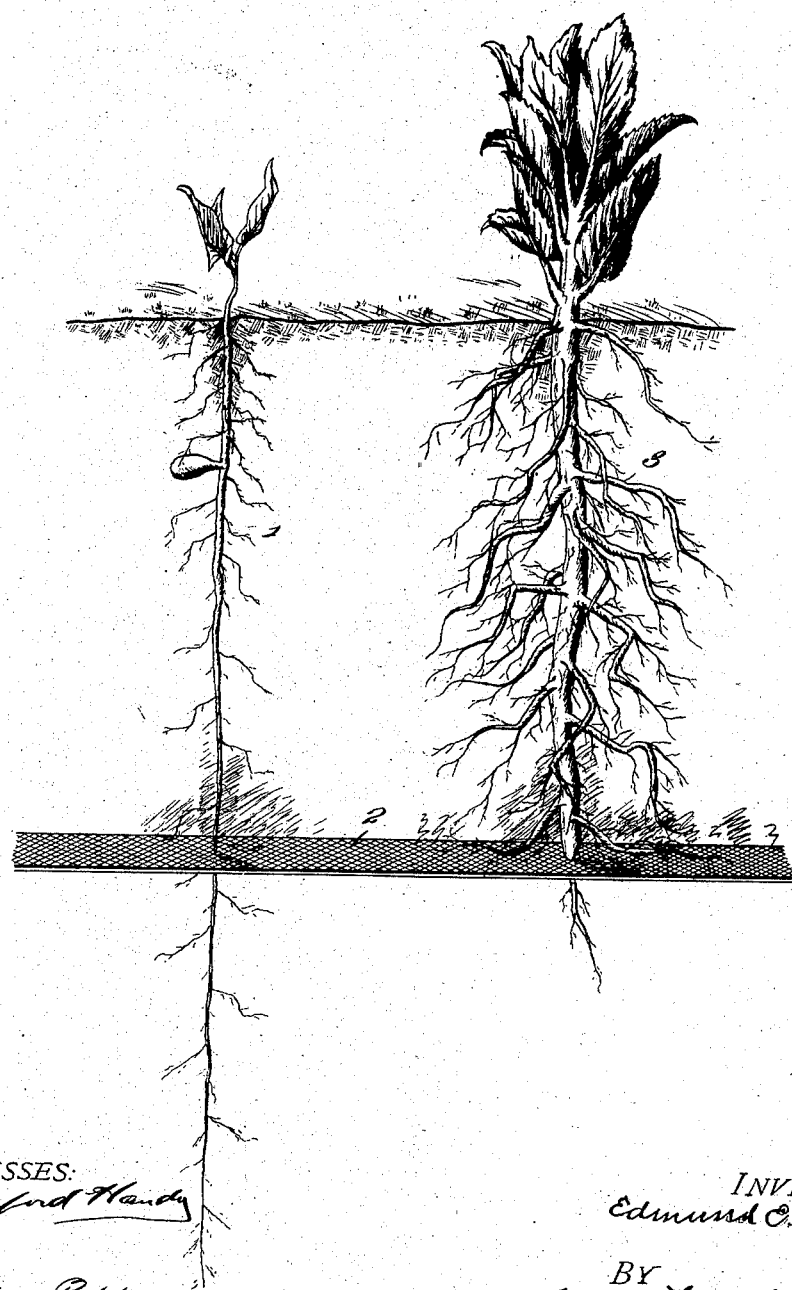

No. 741,833. Patented October 20, 1903.

UNITED STATES PATENT OFFICE.

EDMUND E. RISIEN, OF SAN SABA, TEXAS.

METHOD OF REGULATING GROWTH.

SPECIFICATION forming part of Letters Patent No. 741,833, dated October 20, 1903.

Application filed May 8, 1903. Serial No. 156,301. (No model.)

*To all whom it may concern:*

Be it known that I, EDMUND E. RISIEN, a citizen of the United States, residing at San Saba, in the county of San Saba and State of Texas, have invented certain new and useful Improvements in Methods of Regulating Growth; and I do hereby declare the following to be a full, clear, and exact description of the invention, such as will enable others skilled in the art to which it appertains to make and use the same.

My invention relates to a new and improved method for controlling or regulating the growth of the roots of trees, plants, and shrubbery. The method is especially employed in the controlling of the roots of young trees, and I especially use the method in the propagation of pecan trees. It consists in the controlling of the roots of young plants by means of interposing a metallic open-mesh fiber at the bottom of a trench or ditch, into which is placed suitable soil and which is adapted to surround and cover the seed, nuts, or plants planted therein.

In the drawing reference-numeral 1 designates a plant as it would appear at the early stage of its growth and shows a metallic wire-cloth 2 engaging the tap-root near its end. It will be seen that the tap-root passes through one of the meshes of the said cloth, and as said root grows and enlarges it comes into contact with the mesh and is strangled thereby, causing the plant to send forth a number of lateral roots projecting from the tap-root and causing the entire growth of the roots to be above or between the mesh and the surface of the ground.

Reference-numeral 3 represents a plant that has had its tap-root strangled, as described, in this method, and shows the growth of the secondary or lateral roots extending therefrom. It will be clearly seen that in this operation the life of the plant depends entirely upon its secondary or lateral roots and that the transplanting of the same may be accomplished without injury thereto.

It will be apparent from the foregoing description and the accompanying drawing that when the nut sprouts and the tap-root is put forth the metallic mesh by strangling said root causes the young and tender shoots extending laterally from the main tap-root to enlarge. Therefore when it is desired to transplant the young tree the employment of my method will greatly facilitate the operation and will insure the successful propagation of the young plants or shrubs when necessary to transplant the same.

I do not limit myself to any specially-constructed wire-cloth. As is obvious, the size of the mesh that is to be employed in the nursery is entirely within the option of the operator, as it may be found by experience that a mesh efficient in a certain locality would not be of sufficient strength to control the roots in some other section.

Having thus fully described my invention, what I claim as new, and desire to secure by Letters Patent, is—

1. The improvement in the art of raising plants so as to control their roots to facilitate transplanting, which consists in placing an open-mesh fabric in the bottom of a trench, filling the trench with soil above the fabric and placing a nut or root in said soil above the fabric, substantially as described.

2. The improvement in the art of raising plants, so as to control their roots to facilitate transplanting, which consists in arranging a metallic open-mesh fabric in the bottom of a trench, filling in the trench with soil above the fabric, and placing a nut or root in said soil above the fabric, so that the tap will be choked and branch roots caused to spread out laterally from the tap-root above the fabric.

In testimony whereof I have signed my name in the presence of the two subscribing witnesses.

EDMUND E. RISIEN.

Witnesses:
W. D. COWANS,
JNO. F. CAMPBELL.